Figure 6:
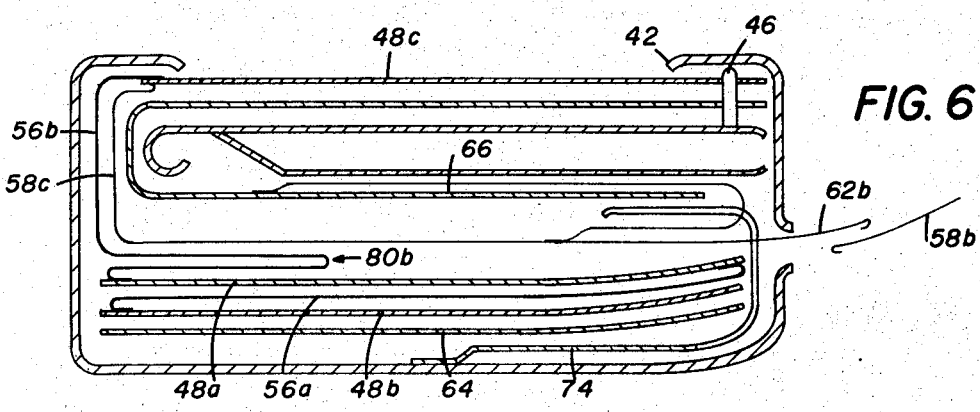
Figure 7:
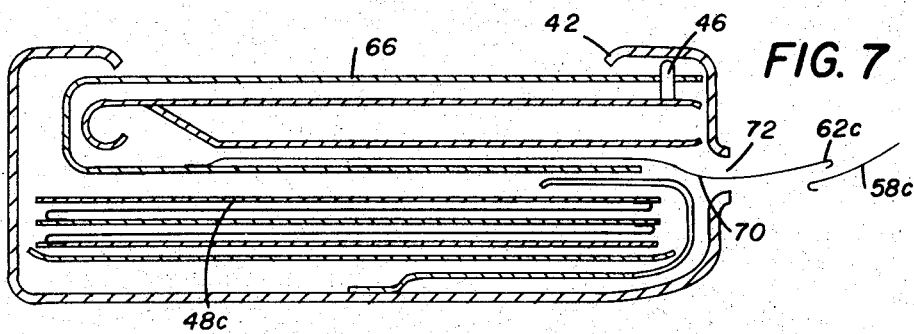
Figure 8:
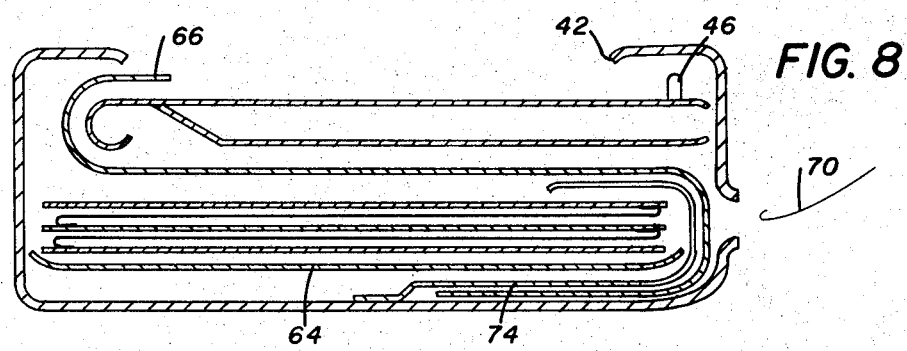

United States Patent

[11] 3,630,132

[72] Inventor Hubert Nerwin
Rochester, N.Y.
[21] Appl. No. 43,069
[22] Filed June 3, 1970
[45] Patented Dec. 28, 1971
[73] Assignee Eastman Kodak Company
Rochester, N.Y.

[54] PHOTOGRAPHIC FILM PACK
9 Claims, 13 Drawing Figs.
[52] U.S. Cl. .................................................. 95/22,
95/13
[51] Int. Cl. ...................................................... G03b 17/50
[50] Field of Search........................................... 95/13, 22,
19

[56] References Cited
UNITED STATES PATENTS
1,054,691 3/1913 Hopkins........................ 95/22
1,682,628 8/1928 Romanowicz et al......... 95/22

*Primary Examiner*—John M. Horan
*Assistant Examiner*—Mathews Alan
*Attorneys*—Walter O. Hodsdon and Robert F. Cody

ABSTRACT: A pack embodying conventional photographic film, in the form of a strip thereof, has such strip so folded and joined that the various exposure sections of the film strip may be successively uncovered in the exposure aperture of the pack, by means of respective pull tabs. The exposed film sections are successively drawn into a storage section within the pack by means of the pull tabs; and such film is stored in the pack in strip form to facilitate subsequent handling thereof. The pack may be employed in cameras of the instant processing-type.

PATENTED DEC 28 1971 3,630,132
SHEET 1 OF 4
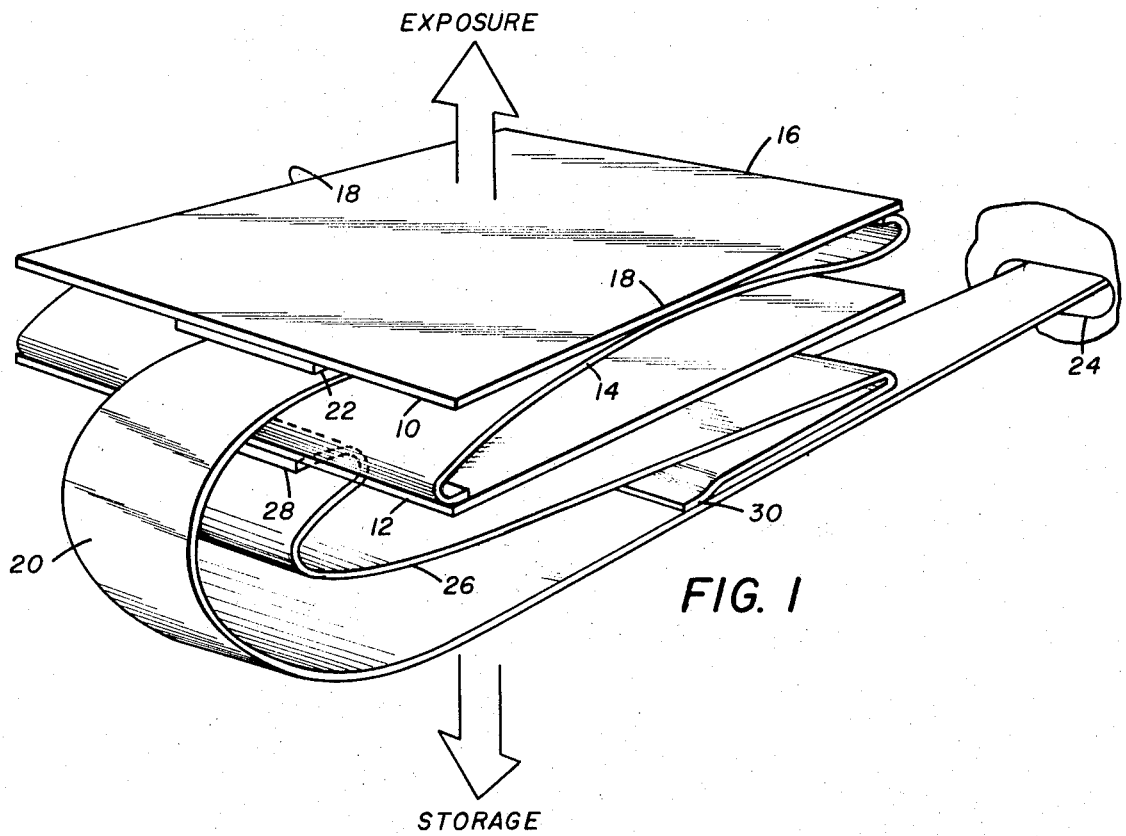
FIG. I
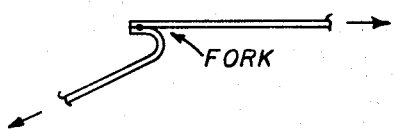
FIG. 2a
FIG. 2b
HUBERT NERWIN
INVENTOR.
BY Walter O. Hodgson
Robert F. Cody
ATTORNEYS

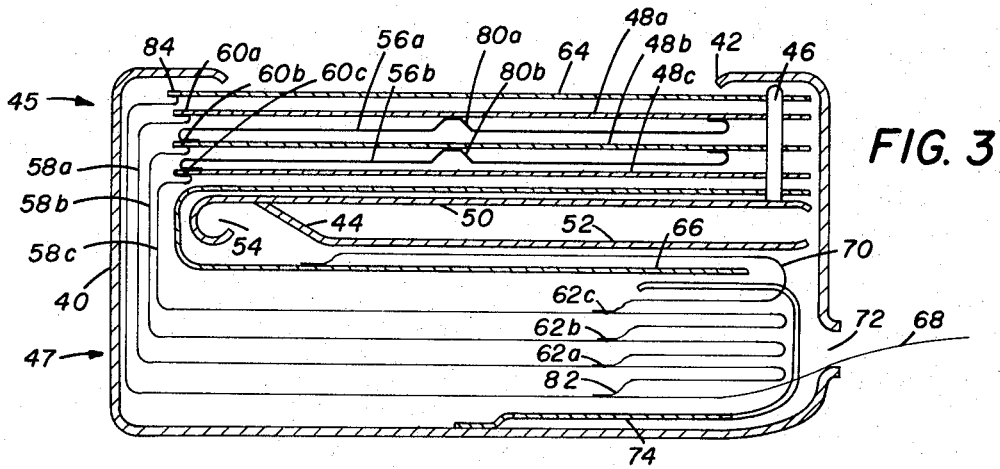
FIG. 3
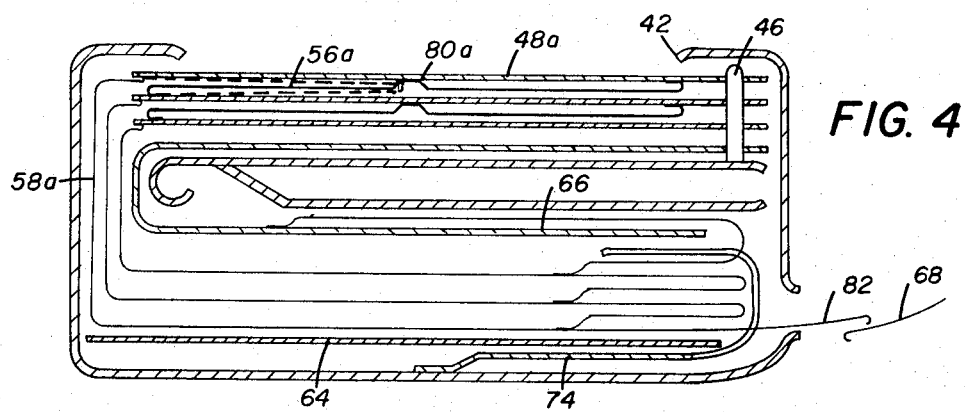
FIG. 4
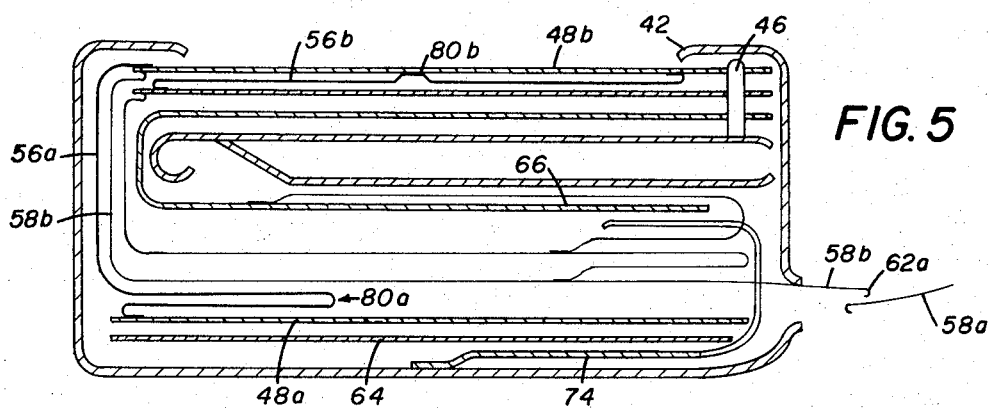
FIG. 5
FIG. 3a
HUBERT NERWIN
INVENTOR.
ATTORNEYS

HUBERT NERWIN
INVENTOR.

ATTORNEYS

PHOTOGRAPHIC FILM PACK

BACKGROUND OF THE INVENTION

1. Field of the Invention

This invention relates in general to packs of conventional photographic film, i.e. film which is not of the instant processing type. In particular, the invention provides, in a film pack, a photographic web or strip that is so folded, and releasably concatenated with pull tabs, that it may be employed in cameras which do not have film-advancing mechanisms, such as those which have been designed principally to accommodate film of the instant processing type.

2. Description Relative to the Prior Art

It frequently will happen that the owner of a camera of the instant processing type would prefer to process film well after it has been exposed, rather than do onsite processing. Such later processing has the advantage of permitting the development of film under laboratory conditions; and permits the use of films of various and different types, depending on the subject(s) to be photographed. In addition, onsite processing may be difficult to manipulate, and to implement, if the photographer has had to get himself, physically, into an awkward position just to be able to snap his pictures.

Cameras which have been designed for photography of the instant processing variety are ordinarily not equipped with means and mechanisms for advancing film from a supply thereof to a storage compartment therefor. Thus, the problem obtains as to how to advance film within a pack when the using camera has no film-advancing means.

It would appear that film packs in solution of the above-indicated problem are already well known in the art, e.g. the film pack of U.S. Pat. No. 1,054,691: The pack of U.S. Pat. No. 1,054,691 houses a strip of conventional photographic film; embodies a number of film-advancing pull tabs, and presents at any given time, only a single pull tab; and stores film, after it has been exposed, to one side of a divider within the pack. As will become apparent later, the pack of U.S. Pat. No. 1,054,691 largely resembles the film pack of the invention. However, as will also become apparent, the pack of U.S. Pat. No. 1,054,691 while embodying unexposed film in strip form, stores such film, after exposure, on a sheet-by-sheet basis. It is to this aspect of the prior art that the invention is mostly directed; and thus, in a film pack according to the invention, film is retained in strip form both before and after exposure. Such a feature facilitates film handling, since modern film-processing machines are designed to process film in continuous lengths thereof.

SUMMARY OF THE INVENTION

A cross-sectional view taken along the edge of a film pack embodying the invention would reveal a film strip arranged to provide a series of interconnected Z-folded units. Each Z-folded unit has a pair of photosensitized sections, or legs, interconnected by a diagonal. The photosensitized leg nearest the exposure aperture of the pack, hereinafter sometimes referred to as the lead leg, has a first pull tab releasably connected to its lead end; and the diagonal is additionally releasably connected to the approximate middle of the lead leg. Such additional connection is crucial to the successful operation of the instant film pack. The first pull tab is threaded back, and around a divider, via a storage section within the pack, to the outside of the pack. And a second pull tab is releasably connected both to the lead end of the second photosensitized leg, and to the first pull tab. Pulling on the first pull tab carries the lead leg into the storage section of the pack, while fully uncovering the second photosensitized leg so that it may be photographically exposed. And as the pull tab for the lead leg exits from the pack, it pulls to the outside of the pack the second pull tab, thus readying the pack for the next exposure.

OBJECT OF THE INVENTION

To provide a photographic film pack having a strip of conventional film therein which is so folded and joined that it may be used within a camera of the instant processing type, and which pack retains, i.e. stores, such film in strip form both before and after such film has been exposed.

The invention will be described with reference to the figures, wherein

Figure 10:
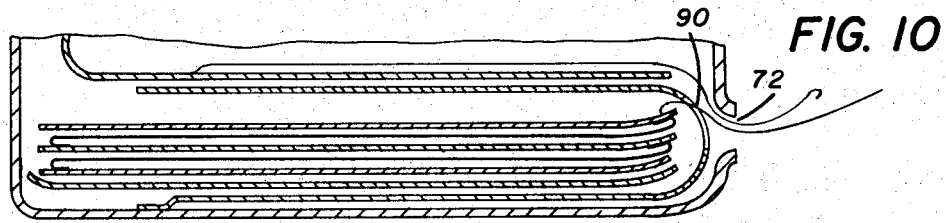
Figure 9:
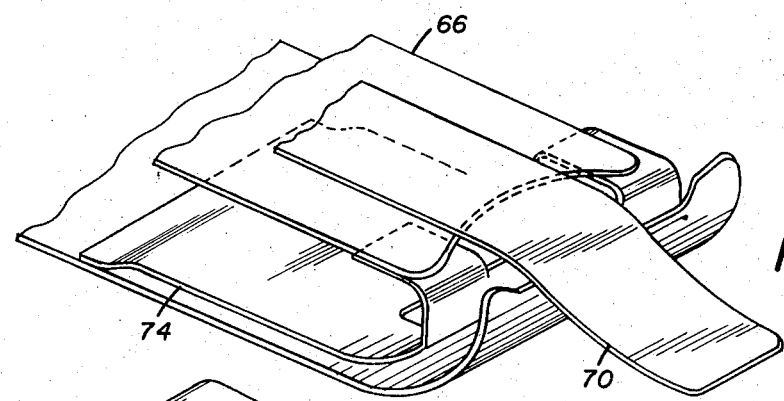
Figure 11:
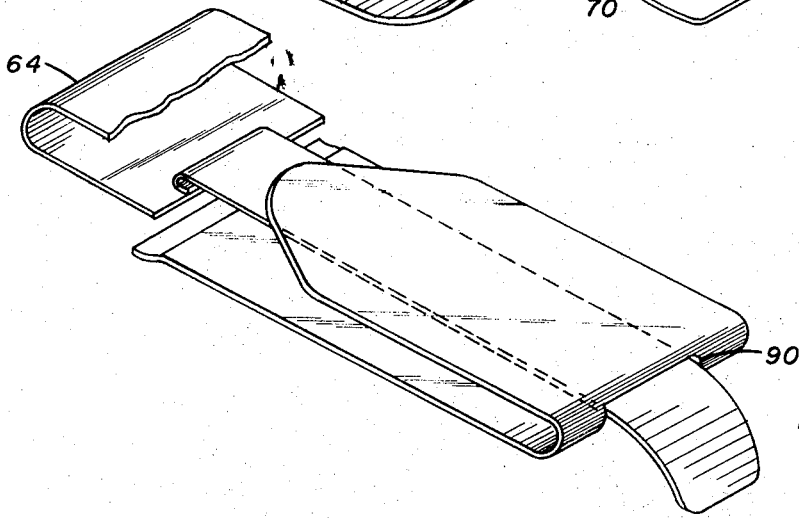

FIG. 1 is a perspective view illustrating the folds and joints necessary to practice the invention, FIGS. 2a and 2b are diagonals useful in describing an aspect of a film pack according to the invention, FIGS. 3 through 9 illustrate a film pack according to the invention, and the various film-handling procedures which occur within such pack, and FIGS. 10 and 11 illustrate a variation which may be made to the pack illustrated in FIGS. 3 through 9.

FIG. 1 indicates the basic Z-fold, joints, and pull tab arrangement common to the various versions of the invention; and which fold permits of a film pack that employs film which is in strip form both before and after exposure.

Referring then to FIG. 1, a pair of photosensitized film sections (legs) 10, 12 are interconnected by a diagonal 14. The diagonal 14 is securely fastened to the trailing end 16 of the lead film section 10; and to the lead end of the trailing film section 12. Either (or both) the film section 10 (before it is photographically developed) or the diagonal 14 must be opaque, thereby to prevent exposure of the trailing film section 12 during the exposure of the lead film section 10. And the diagonal 14 may either be integral with the film sections 10, 12, or securely fastened thereto as shown.

The diagonal 14 is secured, at 18, to the lead film section 10; and it is this connection which is key, and crucial, to the success of the invention. So joining the diagonal 14 and lead film section 10 at 18 has the effect of creating what are known as peel joints, i.e. joints in which two strips are so joined that they may fork and pull apart when one or both of the strips are pulled. See FIGS. 2a, b for examples of peel joints.

A lead pull tab 20, narrower than the film sections 10,12, is connected to the lead film section 10, by means of a peel joint 22; and such pull tab 20 is threaded back around a divider (not shown) through a storage section within the pack, and out the exit slot 24 of the pack. A second pull tab 26 is connected by means of a peel joint 28 to the lead end of the film section 12, and to the pull tab 20 by means of a peel joint 30.

To appreciate how the Z-fold illustrated in connection with FIG. 1 facilitates the use of strip film in a film pack, reference should now be had to FIGS. 3 through 9: A case 40, having an aperture 42 through which exposures may be made, contains a divider 44 which separates the film pack into exposure and storage sections, respectively 45 and 47. The divider 44 has a staple or pin 46 to which film sections 48a, b, c and opaque covers 64, 66 are attached; and the divider 44 is comprised of a pair of leaf springs 50, 52 which serve to press unexposed film toward the exposure aperture 42, and stored film to the bottom of the storage section 47. The staple 46, and the pack itself, are deliberately exaggerated, and distorted, in their vertical sizes to facilitate understanding of the arrangement of parts and folds within the pack. See FIG. 3a for a truer showing of the staple 46.

The end 54 of the divider 44 is curved to aid the movement of exposed film from the exposure section 45 of the pack to the storage section 47 thereof.

Diagonals 56a, b interconnect the film sections 48a, b, c in the manner disclosed in connection with FIG. 1, the pull tabs 58a, b, c for such sections being folded around the divider 44 and stacked in the film storage section 47. The pull tabs 58a, b, c are connected by means of respective peel joints 60a, b, c to the film sections 48a, b, c; and by means of peel joints 62a, b, c to each other.

An opaque lead cover sheet 64, and a trailing opaque cover sheet 66, are also stapled to the divider 44; and such cover sheets have their own "peel joint" pull tabs 68, 70, respectively interconnected with the pull tabs 58a and 58c in the manner shown. Thus, by pulling the cover sheets 64, 66 into place, the pack may be handled in daylight both before and after the film thereof has been exposed. The pull tab 68 is threaded through an exit slot 72 within the pack; and a forked guide 74 (see FIG. 9) within the pack cooperates with the cover sheet 66 to guide same so as to prevent light from entering the exit slot 72 once the sheet 66 has been pulled into place.

As emphasized above in connection with FIG. 1, the diagonals 56a, b are joined edgewise by peel joints 80a, b to the film sections 48a, b; and as will be described presently, such edgewise peel joints are essential to permit exposure of the film sections 48b, c. The film section 48c, being the last section which is to be exposed, has no diagonal cooperative with it; and though only two Z-folded units are indicated in FIGS. 3 through 8 and 10, it is to be realized that such a showing has been made for sake of clarity, and that film packs embodying the invention will ordinarily have many more Z-folded units than has been indicated.

With the film pack of FIGS. 3 through 8 and 10 inserted in a camera, say of the instant processing type, and with the lead 68 extending to the outside of such camera, the pack is readied for its first exposure by pulling on the lead 68. Attendantly, the cover sheet 64 pulls free from the staple 46 and, as shown in FIG. 4, the lead end 82 of the pull tab 58a is withdrawn to the outside of the camera. Since the peel joint associated with the lead end 84 of the cover sheet 64 is squeezed together within the pack, the cover sheet 64 is pulled, under action of the pull tab 68, into the cradle of the forked guide 74. And when the lead end 84 of the cover sheet 64 abuts against the forked guide 74, and can go no further, the pull tab 68 peels away from the cover sheet 64.

After the first film section 48a has been exposed, the tab 58a is pulled, thereby yanking the film section 48a free of the staple 46, and causing it to be drawn for storage into the cradle of the forked guide 74 (see FIG. 5). Absent the edgewise peel joint 80a, such action would cause the diagonal 56a—as the film section 48a moves into the storage section 47—to fold and lay over the second film section 48b, as shown in phantom in FIG. 4, thereby preventing the second film section 48b from ever being fully exposed. By edge-joining the diagonal 56a to the film section 48a, however, the diagonal 56a is prevented from folding within the aperture 42, and thus gets pulled into the storage section 47 with the film section 48a. In this version of the invention, the last bit of travel for the film section 48a, into the cradle of the forked guide 74, causes the edgewise peel joint 80a to pull apart.

As the pull tab 58a was pulled to bring the first film section 48a into the storage section 47 of the pack, the peel joint end 62a of the pull tab 58b was brought through the exit slot 72 of the pack, thus readying the film pack for the next exposure; and as the pull tab 58b is pulled to store the second film section 48b, after it has been exposed, the diagonal 56a is laid between the film sections 48a, b. See FIG. 6.

As each exposed film section 48 is stored, the divider 44 with its remaining attached film sections gradually floats toward the exposure aperture 42, thereby to keep each film section which is to be exposed in the plane of the aperture 42, and to make storage room for the film sections which have been exposed.

When, and as, the last film section 48c is stored (FIG. 7), the cover sheet 66 is left residing in the aperture 42, its pull tab 70 being brought through the exit slot 72 of the pack by the pull tab 58c. Pulling on the tab 70 causes the cover sheet 66 to ride around the forked guide 74, thereby blocking light from entering the pack through the slot, and thus permitting the fully exposed film pack to be handled in daylight. See FIGS. 8 and 9.

FIGS. 10 and 11 are presented to indicate that the guide—within which the exposed film sections are stored, and around which the cover sheet 66 is steered—may take a variety of forms: The guide of FIGS. 10 and 11 may be comprised of folded stiff opaque paper having a slot 90, at the fold, and in alignment with the slot 72 of the pack.

The invention has been described in detail with particular reference to preferred embodiments thereof, but it will be understood that variations and modifications can be effected within the spirit and scope of the invention.

What is claimed is:

1. A photographic film pack having an exposure aperture therein, and containing divider means for separating said pack into an exposure compartment and a film storage compartment, said storage compartment having an aperture therein, the film in said pack being in strip form and so disposed within said pack that when a first exposure section of the film strip is within the said exposure aperture, a second exposure section of the film strip is covered by the first exposure section, the two exposure sections being cooperative with each other to form a Z-fold with a diagonal residing therebetween, said diagonal being joined edgewise to the said first exposure section, a first pull tab releasably joined to the end of said first exposure section to which the said diagonal is not attached, and a second pull tab releasably joined to the end of said second film section to which said diagonal is attached, the second pull tab being joined to the first pull tab, and said first pull tab being adapted to be drawn through the aperture in said storage compartment.

2. The pack of claim 1 including an opaque cover sheet, said cover sheet being adapted to occupy the exposure aperture of said pack before any exposures of the film sections within said pack have been made, said opaque cover sheet having a pull tab releasably secured to it and drawn through the aperture in said storage compartment, the pull tab for the first exposure section of said film strip being releasably secured, within the pack, to the pull tab for the said opaque cover sheet.

3. The pack of claim 1 wherein
   a. said divider means has releasably secured thereto the ends of said exposure sections which do not have metering strips secured to them, and
   b. said pack includes guide means within the storage compartment of said pack and having a cradle for receiving the exposure sections of said film strip which are drawn into said storage compartment, said guide means having an opening therein through which said pull tabs are adapted to be drawn, said opening being in communication with the aperture in said storage compartment, the width of said opening, and said pull tabs, being narrower than the width of said exposure sections.

4. The apparatus of claim 3 including an opaque cover sheet releasably secured to said divider means, said cover sheet being adapted to occupy the exposure aperture of said pack before any exposures of the film sections within said pack have been made, said opaque cover sheet being substantially as wide as said exposure sections and having a pull tab narrower than said guide opening and said aperture in said storage compartment, said cover sheet pull tab being releasably secured to said cover sheet and drawn through the guide opening and through the aperture in said storage compartment, the pull tab for the first exposure section of said film strip being releasably secured, within the pack, to the pull tab for the said opaque cover sheet.

5. The pack of claim 4 including a second opaque sheet substantially as wide as the said cover sheet, said second opaque sheet having a first part in said exposure compartment, said first part being releasably secured to said divider means and being so disposed within the pack that said cover sheet and said opaque first part sandwich said Z-folded film strip between them when said cover sheet is within the exposure aperture of the pack, said second opaque sheet also having a second part which is wrapped around said divider means and disposed to reside between said divider means and said guide means, said second part having a pull tab releasably secured to it, and to the pull tab for the last exposure section which is adapted to reside in said exposure section.

6. The pack of claim 5 wherein said divider means includes first and second means for respectively urging the parts of said film strip in said exposure and storage compartments away from said divider means, and said divider means being positionable within said pack with respect to said exposure aperture.

7. The pack of claim 6 wherein the cradle of said divider means is formed in a member that is forked to define an opening having a width narrower than the width of said exposure sections.

8. The pack of claim 6 wherein the said guide means is comprised of a sheet folded to define a cradle, said folded sheet having a slotted opening therein proximate the said fold, said slotted opening being sized narrower than the width of said exposure sections.

9. The pack of claim 1 wherein said pull tabs are releasably joined to said exposure sections and to each other by means of peel joints, and wherein said diagonal and said first exposure section are joined by means of at least one peel joint.

* * * * *